United States Patent [19]
Rau

[11] Patent Number: 5,937,782
[45] Date of Patent: Aug. 17, 1999

[54] UNDERWATER DEVICE WITH A SACRIFICIAL LATCH MECHANISM

[75] Inventor: Brien G. Rau, Jefferson, La.

[73] Assignee: Input/Output, Inc., Stafford, Tex.

[21] Appl. No.: 08/950,827

[22] Filed: Oct. 15, 1997

[51] Int. Cl.⁶ .............................. B63B 21/56; B63G 8/14
[52] U.S. Cl. .......................................... 114/247; 114/245
[58] Field of Search ................... 114/243, 244, 114/247, 245, 217, 242

[56] References Cited

U.S. PATENT DOCUMENTS

| | | | |
|---|---|---|---|
| 3,931,608 | 1/1976 | Cole | 340/7 |
| 4,222,340 | 9/1980 | Cole | 114/245 |
| 4,290,124 | 9/1981 | Cole | 367/18 |
| 4,586,452 | 5/1986 | Lapetina et al. | 114/245 |
| 4,709,355 | 11/1987 | Woods et al. | 367/16 |
| 4,711,194 | 12/1987 | Fowler | 114/245 |
| 4,879,719 | 11/1989 | Dumestre, III | 367/20 |
| 5,214,612 | 5/1993 | Olivier et al. | 367/16 |
| 5,529,011 | 6/1996 | Williams, Jr. | 114/245 |

*Primary Examiner*—Sherman Basinger
*Assistant Examiner*—Patrick Muldoow
*Attorney, Agent, or Firm*—James T. Cronvich

[57] ABSTRACT

A device connected to an underwater cable by means of a sacrificial latch mechanism that breaks to protect the housing of the device from irreparable damage due to collisions with jetsam or other objects. The underwater device is connected to a cable having mounting elements disposed along its length. The device includes a housing and a latch body attached to the housing by a retainer, such as a set screw. A locking member extends from the latch body to engage the mounting element. A sacrificial element, such as a thin portion of the latch body or a frangible portion of the retainer, gives way in response to a predetermined force acting to separate the device from the cable before the force can damage the housing.

20 Claims, 5 Drawing Sheets

UNDERWATER DEVICE WITH A SACRIFICIAL LATCH MECHANISM

BACKGROUND

The invention relates to marine seismic prospecting and, more particularly, to a device attached to an underwater cable by a sacrificial latch mechanism.

In marine seismic exploration, a streamer cable is towed underwater behind a survey vessel. An array of hydrophones is mounted in the cable, and a seismic source, or gun, is fired to generate seismic energy that radiates through the water and into the earth. Reflections of the seismic energy off geologic strictures are sensed by the hydrophones. Data representing the detected energy are transmitted to the vessel for later processing to produce maps showing subsea formations likely to contain oil and gas.

To create accurate maps, it is necessary to know the shape of the streamer cable during the seismic data-gathering process. For this purpose, depth control devices, commonly referred to as cable-leveling "birds," are attached to the cable at intervals along its length. The depth control devices are equipped with adjustable diving planes, or wings, whose angles of attack can be varied by motor to maintain a preselected depth. The depth control devices frequently include highly accurate heading sensors, or digital compasses, whose heading outputs are transmitted to the vessel. From the compass heading data, the shape of the cable can be accurately determined.

Typically, each depth control device is detachably connected to the cable by one or more collars, which are attached to the cable. Each collar comprises cylindrical inner and outer races surrounding the streamer. The inner race is affixed to the streamer. The outer race, to which the depth control device is semi-pennanently attached, can freely rotate about the inner race and, hence, the streamer. The outer race, which may be hinged for easy removal from and attachment to the inner race, has a slot for engagement by a locking bolt extending out of the depth control device to retain the device to the outer race. An exemplary collar mechanism is described in U.S. Pat. No. 5,507,243, "CONNECTOR FOR UNDERWATER CABLES," Apr. 16, 1996. The locking bolt is adjustable between locked and unlocked positions as part of a latch mechanism. The locking bolt and other parts of the latch mechanism reside wholly or partly in cavities in the housing of the depth control device. Internal surfaces of the housing serve as bearing surfaces for the various elements of the latch mechanism. A typical latch mechanism is described in U.S. Pat. No. 5,214,612, "SWING PLATE LATCH MECHANISM," May 24, 1993.

As the streamer is towed through the water, it often happens that jetsam and other debris collide with the devices attached to the cable. Depending on the size of the debris and the tow speed of the vessel, the impact on the devices can be severe. Strong impacts can also result during payout and retrieval of the streamer from collisions with structures on the vessel. These impacts can exert strong forces on the devices that can deform or even fracture the housings. Damaged housings can result in seawater intrusion into the electronics in the devices, binding of the wings, or broken latch mechanisms. In these instances, the housing must clearly be replaced. Even if the force of impact causes only a slight deformation of the housing, the accuracy of the heading sensor contained within can be compromised if the deformation changes the relative alignment of the housing to the cable. A deformation causing even a 1° or smaller change in alignment may be unacceptable in certain seismic applications. Typically, the solution is to replace the deformed device with an undeformed device. Damaged or deformed housings typically cannot be repaired and must be discarded. Even though the internal electronic components can be salvaged, they must typically be removed, reinstalled, and calibrated at the factory. Thus, it is clear that damaged or deformed housings can add significantly to the cost of outfitting and maintaining a streamer cable.

Clearly there is a need for avoiding permanent damage to expensive parts and for making field repairs possible in the inevitable event of collisions between cable-attached underwater devices and shipborne structures or underwater debris.

SUMMARY

This need and others are satisfied by an underwater-cable-connected device having features of the invention, which includes a housing, a retainer, and a latch mechanism with a latch body attached to the housing by the retainer in normal operation. A locking member extends between the latch body and a mounting element to hold them together securely in a locked position connecting the device to the cable. When forces, such as those resulting from collisions with underwater debris, act on the latch body, a sacrificial element gives way to release the attachment of the latch body to the housing by the retainer before the forces reach a level sufficient to damage the housing.

In a preferred version of the invention, the latch body resides in a cavity in the housing. The locking member is retained in a chamber in the latch body and is movable between locked and unlocked positions engaging and disengaging with the mounting element, typically a receptacle in an outer collar race. The sacrificial element may be realized in various ways. In one version, the latch body forms a bore through which the retainer extends into the housing to retain the latch body to the housing. The housing may be made of a stronger material than the latch body. A portion of the latch body around the bore, for example, the portion between the bottom side of the latch body and the bore, is relatively thin and gives way under forces tending to separate the device from the cable before the main housing is deformed or otherwise damaged. In this way, only the relatively inexpensive sacrificial latch body need be replaced, rather than the entire underwater device. The replacement of the latch body is simple enough that it can be done on the back deck of the vessel or even in the water from a small support boat when the cable is surfaced.

In other versions, the sacrificial element can be a portion of the retainer that breaks when the force reaches too great a level. In yet another version, the housing has an access hole that extends into the latch cavity. An access aperture extending into the chamber of the latch body is aligned with the access hole in the housing to admit an insertable tool that can be used to lower and raise the locking member or pin into and out of locking engagement with the mounting element. One version of the tool has an eccentric camming surface on which the locking pin rides up and down between locked and unlocked positions as the tool is rotated. External tool access to the locking member eliminates the need for permanently installing a relatively costly camming element in each latch mechanism.

DRAWINGS

These and other features, aspects, and advantages of the invention are better understood by referring to the following description, appended claims, and accompanying drawings, in which:

DESCRIPTION

Figure 1:
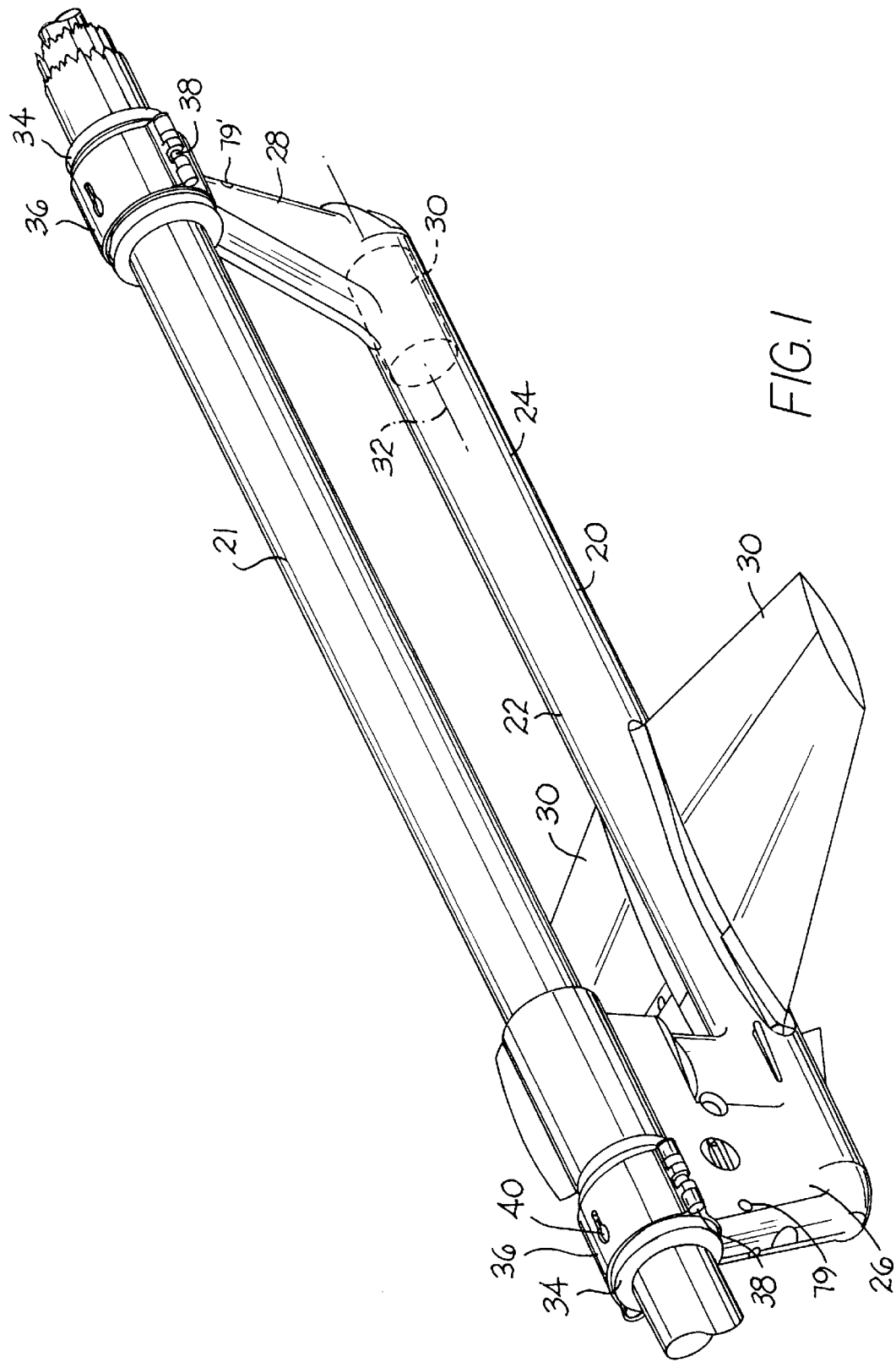
FIG. 1 is a perspective view of an underwater device embodying features of the invention attached to a section of streamer cable.

An exemplary version of the underwater device 20 embodying features of the invention is shown in FIGS. 1–5. The device depicted in FIG. 1 is a cable-leveling bird attached to a streamer cable 21. The bird housing 22 includes a tubular main body section 24 and a front pylon 26 and a rear pylon 28. Two motor-driven fins 30, or wings, extend from the main body section to control the depth of the cable. A pressure sensor in the front pylon is used to determine the depth of the bird so that the wings can be appropriately adjusted to maintain a desired depth. The housing 22 also contains the motor and other electronic components used to control the wings, read the pressure sensor, and communicate with a towing vessel over wires in the cable 21. The bird may also house a heading sensor 30, or digital compass, to provide a highly accurate indication of the orientation of the cable. The heading information relayed to the vessel is used to determine the shape of the cable during a seismic prospect. The calibrated heading sensor is accurately aligned in the housing 22 along a heading axis 32 aligned with the axis of the tubular main body section, which serves as the bird's heading reference axis.

Figure 2:
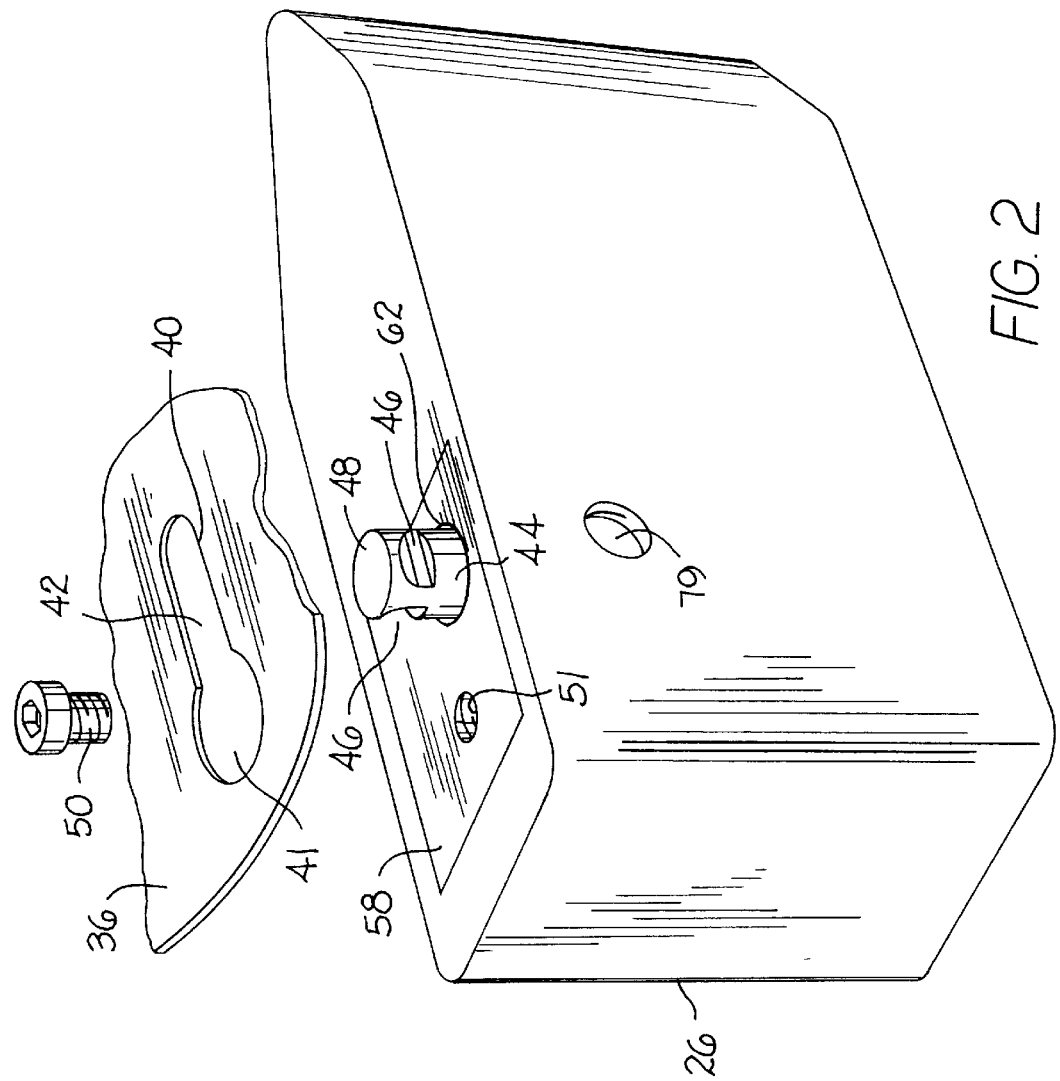
FIG. 2 is a perspective view showing a typical arrangement for connecting the underwater device of FIG. 1 to the outer race of a mounting collar.

Collar rings 34 are firmly clamped around the cable 21 at front and rear mounting positions. The rings form an inner race to accommodate a connector assembly 36, which can freely rotate about the ring and, hence, the cable. Although it does not have to be, the connector could be a hinged assembly with removable hinge pins 38, such as the Quick Latch™ collar assembly manufactured by DigiCOURSE, Inc. of Harahan, La., or could be an unhinged, or other, assembly providing a means of attachment to the cable. As shown in FIG. 2, the connector 36 includes a receptacle 40, in the shape of, for example, a keyhole with a large opening 41 at one end and a slot 42 at the other end. A typical connector has a second similar receptacle 180° around its circumference to similarly accommodate another device, such as a flotation tube. The connector 36 is attached to the bird by a locking member 44, preferably a dovetail pin, extending from the pylons 26, 28 of the housing 22. To avoid redundancy, subsequent descriptions focus on the attachment to a mounting element at the front pylon 26, but apply also to the attachment at the rear pylon 28. The preferred locking pin 44 has a pair of opposite horizontal grooves 46 just below its top 48. The circumference of the top is just less than the circumference of the large opening 41 in the receptacle 40. The opposing grooves are dimensioned to allow the locking pin 44 to slide along the slot 42 in the receptacle to its end opposite the large opening. In this way the locking member engages the receptacle of the connector securely in a locked position. A lock screw 50 tightened into a threaded hole 51 in the pylon or other similar fastener offset along the slot 42 from the locking pin can be used to provide a more stable two-point retention of the pylon 26 to the connector 36.

Figure 3:
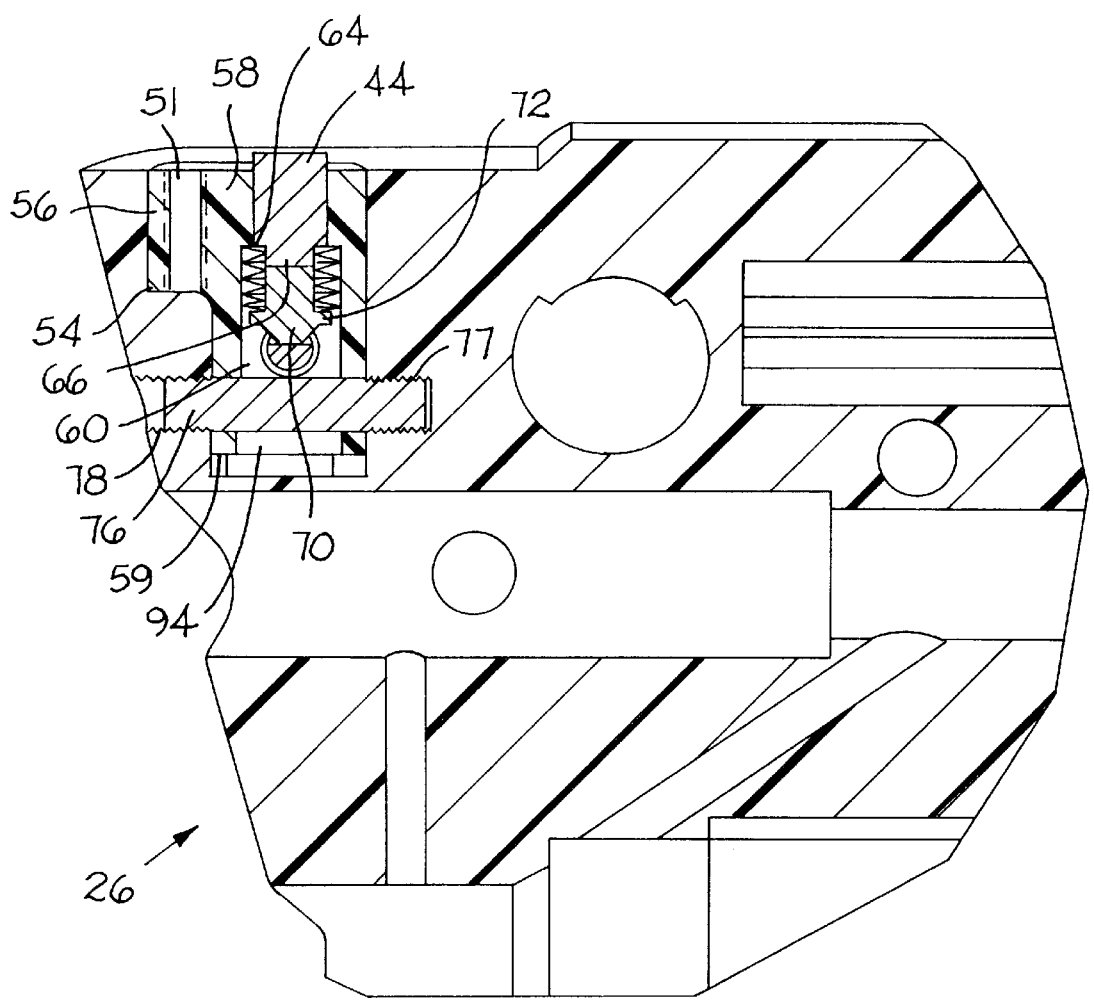
FIG. 3 is a cross-sectional side elevation view of a portion of the housing of the underwater device of FIG. 1 showing a latch mechanism embodying features of the invention.
Figure 4:
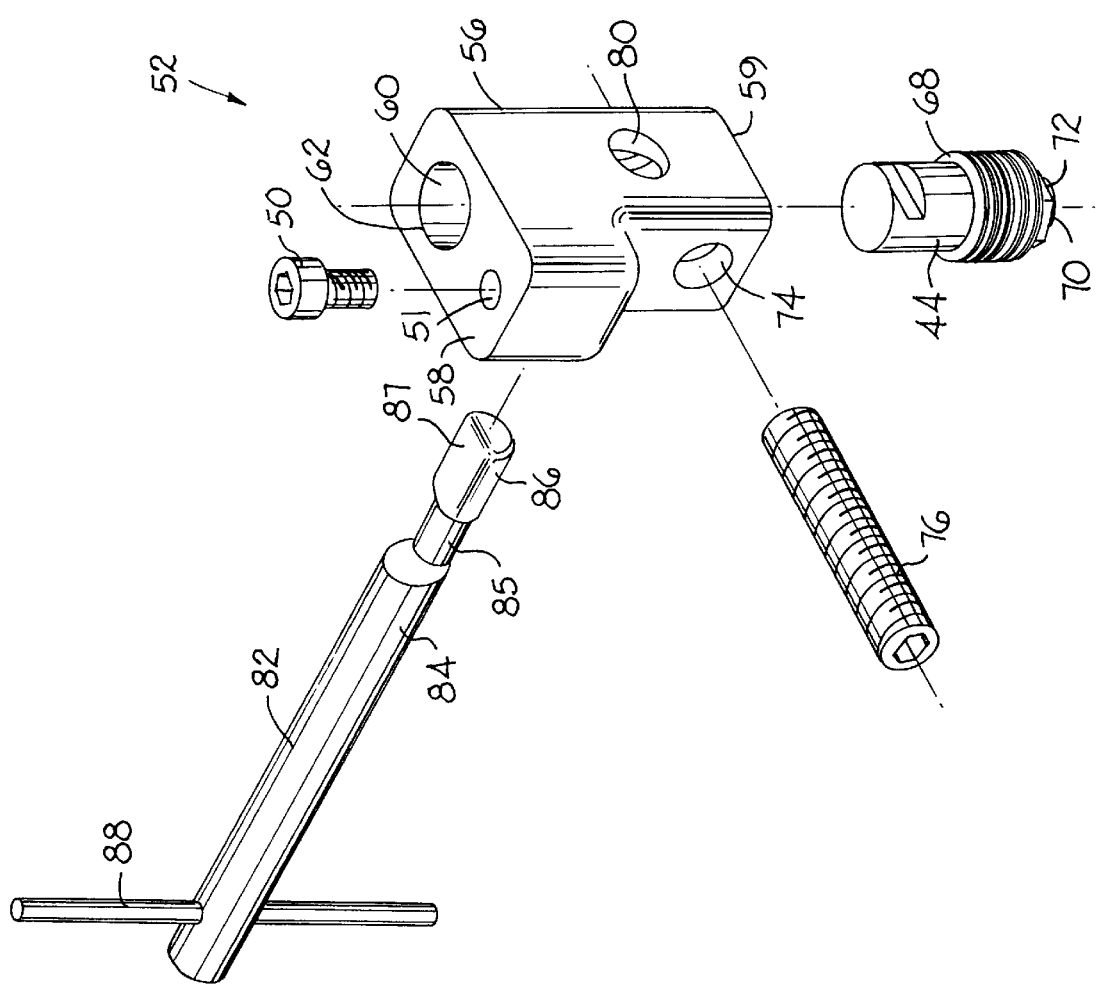
FIG. 4 is an exploded perspective view of the latch mechanism of the underwater device of FIG. 1, showing a latch body and a latching/unlatching tool.
Figure 5:
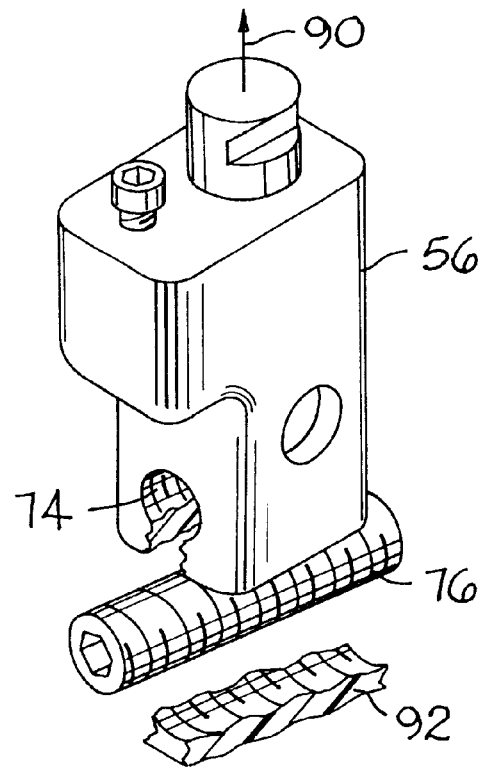
FIG. 5 is a perspective view of the latch body of FIG. 4 after undergoing a force sufficient to break it before the housing is damaged.

Further details of a preferred version of a latch mechanism 52 are shown in FIGS. 3–4. The housing pylon 26 includes a latch cavity 54 sized to receive a latch insert body 56. The latch body has a top side 58 and an opposite bottom side 59. The top side faces the cable and is preferably flush with the pylon's upper surface. The latch body includes a chamber 60 having an opening 62 in the top side through which the top 48 of the locking pin 44 protrudes. The chamber wall forms a circumferential ledge 64 recessed into the latch body. The locking pin includes a region 66 having a thinner diameter to accommodate a stack of Belleville washers 68. The stack of washers is retained at the bottom by a dome-shaped plug 70 having a circumferential flange 72 to support the stack. When the locking pin 44 is engaged with a connector 36, the pin is pulled outward slightly in its locking position. The Belleville washers are compressed between the flange 72 and the ledge 64 of the chamber 60. In this way they apply a biasing spring force acting to retract the pin back into the chamber and, consequently, holding the connector tightly to the top of the pylon 26.

The latch body 56 preferably includes a bore 74 through which a retainer 76, such as a set screw, can extend. The housing pylon 26 includes aligned threaded bores 77, 78, which the set-screw retainer engages. The retainer retains the latch body 56 to the housing. The retainer can also serve to prevent the top of the locking pin 44 from dropping below the top side 58 of the latch body when the device is not engaged with a connector 36 and the Belleville washer stack 68 is relaxed, allowing the pin to bottom out against the retainer.

An access hole 79 formed in the front pylon 26 (and a similar access hole 79' in the rear pylon 26) extends into the latch cavity 54. An access aperture 80 formed in the latch body 56 is aligned with the access hole to admit a tool 82 into the locking pin chamber 60. The inserted tool can be used to lift the locking pin 44 up against spring pressure to an unlocked position for removing the bird from and installing it on a connector 36. In removing birds, once the locking pin is clear of the receptacle, the tool can be removed from the access hole. In attaching birds, the tool can be removed once the locking pin is in its locked position at the end of the receptacle slot. A screwdriver or other such shafted tool can also be used.

One version of tool that works well is shown in FIG. 4. The tool 82 has a first shaft portion 84 and a second shaft portion 85 forming an eccentric camming surface on the second shaft portion. An end portion 86 of the tool is similar to the first portion, but includes a flat surface 87. The tool is inserted into the chamber 60 through the aligned access hole 79 and access aperture 80. The flat surface 87 makes it easier for the tool to slip under the dome-shaped plug 70 at the bottom of the locking pin 44. The tool is inserted until the eccentric portion 85 is under the dome-shaped plug. The end portion 86 is supported by the walls of the access hole and aperture on the other side of the latch body. As the tool is rotated, the eccentric camming surface, which is eccentric relative to the first shaft portion and the end portion, engages the dome-shaped plug and raises and lowers the locking pin between unlocked and locked positions. The tool includes a handle 88 for better leverage. This allows for easy deployment of devices on a streamer cable and eliminates the need for a costly eccentric cam to be built into each latch mechanism.

Figures 6A, 6B:
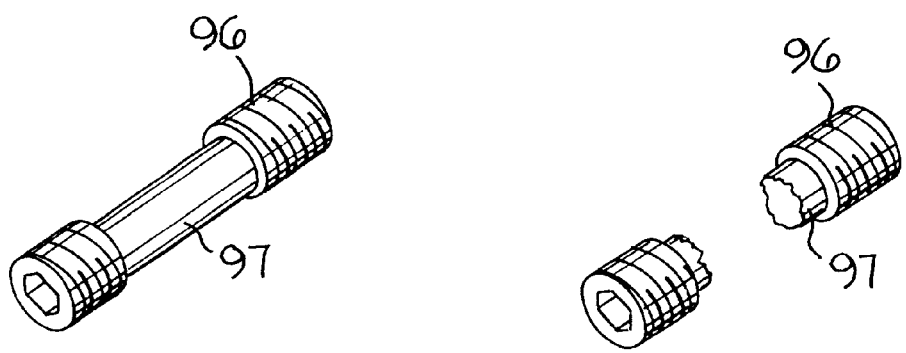
FIGS. 6A and 6B are perspective views of another version of the invention showing a sacrificial retainer before and after fracture.

During collisions between birds and underwater debris or vessel structures, the impact typically imparts a force with a component in the direction of arrow 90 (FIG. 5) that tends to separate the bird from the cable. In many instances, the force can be so great that the housings of conventional birds or other cable-attached devices can be irreparably damaged. This is especially true of devices that include a heading sensor, for which even relatively small distortions in the housings can cause intolerable alignment errors. As shown in the latch body version of FIG. 5, when the component of force 90 acting on the latch body increases above a predetermined level, a thin portion 92 of the latch body around the bore 74 gives way under pressure from the retainer 76. Acting as a sacrificial element, the broken-away portion prevents the force of impact from reaching a level great enough to damage the rest of the housing 22. The force required to break the sacrificial element can be taken into account in designing the part. For example, the thickness of the material around the bore 74 can be changed to withstand different levels of forces. As shown in FIG. 3, the bottom side 59 of the latch body can include a void 94 to lessen the amount of material around the bore subject to the pressure of the retainer. A variety of materials can be used to construct the latch body 56 to tailor its failure loads and modes for different applications. Particularly suitable materials for the latch body include moldable plastics because of their versatililty, light weight, and corrosion-resistance, but other materials could also be used. It is also possible to use other parts of the overall latch mechanism 52 as the sacrificial element. For example, as shown in FIGS. 6A and 6B, another version of a retainer 96 has a frangible region 97 that breaks under pressure from the walls of the surrounding bore 74 of the latch body 56. The frangible region could be formed by a thinner diameter material, as shown, or by making the retainer out of a different material than a typical steel set screw, such as a plastic or ceramic or other more brittle or generally weaker material.

Once the sacrificial element gives way upon impact, the bird 20 is still retained to the cable 21 by the latch mechanism 52 at the other pylon or, in the event both latch mechanisms are sacrificed, by a lanyard (not shown) attached to the housing 22 and looped around the cable. The bird merely has to be retrieved and the broken sacrificial latch mechanism replaced by a good one before returning to service. There is no need to replace the entire bird with another and send the damaged bird back to the factory for repair or disposal.

Although the invention has been described in detail with reference to preferred versions, other versions are possible. For example, the inner ring/outer connector assembly was used throughout as an exemplary mounting element for attaching devices to underwater cables. Other mounting elements that are engageable by a locking member extending between the mounting element and a latch body could equivalently be used. The locking pin need not be a dovetail pin as described. Other locking and latching schemes could be substituted for the dovetail/slot scheme described in the depicted versions. Hooks, clasps, and bolts are only a few of the locking elements that one could substitute for the dovetail pin described. The sacrificial element could be realized in other ways. The retainer need not extend all the way through the latch body and need not be a set screw. A shear pin or other frangible structure could be used to retain the latch body in normal operation and to yield under prese- lected levels of force acting on the latch body. It is clear that one skilled in the art would recognize many equivalent structures for attaching devices to underwater cables. Although the description used the cable-leveling bird as a exemplary cable-attached device, other devices, such as acoustic ranging devices, cable retrieval devices, flotation devices, and other sensing devices, could derive benefit from the features embodied in the described versions. The invention also has application on untowed bottom cables to which similar devices are attached. Therefore, the spirit and scope of the claims are not limited to the description of the preferred versions.

What is claimed is:

1. A device connected to an underwater cable having mounting elements disposed therealong, comprising:

a housing for housing the device;

a retainer;

a latch body attached to the housing by the retainer in normal operating conditions;

a locking member extending between the latch body and a mounting element and holding the latch body securely to the mounting element in a locked position to connect the device to the underwater cable; and a sacrificial element that gives way to release the attachment of the latch body to the housing by the retainer in response to a force greater than normal operating forces acting on the latch body before the force increases to a level sufficient to damage the housing, while the locking member remains in the locked position securely holding the latch body to the mounting element on the underwater cable.

2. A device as in claim 1 wherein the sacrificial element forms a portion of the latch body.

3. A device as in claim 1 wherein the latch body forms a bore and the retainer extends through the bore into the housing and wherein the sacrificial element comprises a portion of the latch body around the bore.

4. A device as in claim 1 wherein the sacrificial element is a frangible portion of the retainer.

5. A device attached to an underwater cable having mounting elements disposed therealong, comprising:

a housing forming a cavity;

a latch body residing in the cavity and having a top side and a bottom side and forming a chamber with an opening in the top side facing the underwater cable;

a locking member retained in the chamber movably between locked and unlocked positions and extending through the opening to securely engage a mounting element of the underwater cable in the locked position;

a retainer retaining the latch body in the cavity to the housing; and a sacrificial element that gives way to release the latch body from the housing in response to a predetermined force tending to separate the underwater device from the underwater cable, the predetermined force being less than the force required to damage the housing.

6. A device as in claim 5 wherein the sacrificial element forms a portion of the latch body.

7. A device as in claim 5 wherein the latch body forms a bore and the retainer extends through the bore into the housing and wherein the sacrificial element comprises a portion of the latch body around the bore.

8. A device as in claim 7 wherein the sacrificial element comprises the portion of the latch body between the bore and the bottom side of the latch body.

9. A device as in claim 5 wherein the sacrificial element is a frangible portion of the retainer.

10. Apparatus connected to an underwater cable, comprising:

a connector attached to the underwater cable, the connector having a receptacle formed therein;

an attachable device, comprising:

a housing with a latch cavity;

a latch mechanism, comprising:

a latch body releasably residing in the latch cavity, the latch body having a top side and a bottom side and forming a chamber having an opening in the top side facing the connector;

a locking pin retained in the chamber movably between locked and unlocked positions and extending through the opening in the top side of the latch body to securely engage the receptacle in the connector;

a retainer retaining the latch body in the latch cavity to the housing;

a sacrificial element that gives way in response to a predetermined force on the latch body to release the latch body from the housing before the force can increase to a level sufficient to damage the housing.

11. Apparatus as in claim 10 wherein the latch body forms a bore and the retainer extends through the bore into the housing and wherein the sacrificial element comprises a portion of the latch body around the bore.

12. Apparatus as in claim 10 further comprising a lock screw extending through the receptacle of the connector and threadedly engaging the latch body through the top side, the head of the lock screw retaining the connector to the latch body at a position along the receptacle spaced apart from the locking pin for stable two-point retention.

13. Apparatus as in claim 10 wherein the housing forms an access hole extending into the cavity and wherein the latch body forms an access aperture extending into the chamber, the access hole and the access aperture being aligned to admit a tool to access the locking pin to move the locking pin up and down in the chamber into and out of engagement with the receptacle in the connector.

14. Apparatus as in claim 13 wherein the tool comprises a first shaft portion and a second shaft portion forming an eccentric camming surface on the second portion to engage the locking pin to raise and lower the pin in the chamber as the tool is rotated.

15. A sacrificial latch mechanism residing in a cavity in the housing of a device for attaching the device to an underwater cable, comprising:

a latch body residing in the cavity, the latch body having a top side and a bottom side and forming a chamber having an opening in the top side facing the underwater cable;

a locking pin biased in the chamber and movable between a locked position and an unlocked position, a locking end of the locking pin extending through the opening in the top side of the latch body;

a retainer retaining the latch body in the cavity to the housing of the device; and a sacrificial element that gives way in response to a predetermined force on the latch body to release the retention of the latch body to the housing of the device before the force reaches a level sufficient to damage the housing.

16. A device connected to an underwater cable having mounting elements disposed therealong, comprising:

a housing;

a retainer;

a latch body attached to the housing by the retainer in normal operating conditions;

a locking member extending from the latch body to engage a mounting element securely in a locked position to connect the device to the underwater cable;

wherein the latch body includes a frangible portion that breaks to release the attachment of the latch body to the housing in response to a force greater than normal operating forces acting on the latch body before the force increases to a level sufficient to damage the housing.

17. A device as in claim 16 wherein the latch body forms a bore and the retainer extends through the bore into the housing and wherein the frangible portion is a portion of the latch body around the bore that breaks under contact pressure from the retainer before the force acting on the latch body increases to a level sufficient to damage the housing.

18. A method for preventing damage to the housing of a device connected to an underwater cable in the presence of impacts to the device, comprising the steps of:

connecting the device to the underwater cable with a latch mechanism;

locking the latch mechanism securely to a mounting element on the underwater cable;

retaining the latch mechanism to the housing;

providing the latch mechanism with a sacrificial element that gives way to release the retention of the latch mechanism to the housing in response to a predetermined force acting on the latch mechanism before the housing can be damaged; and maintaining the secure lock between the latch mechanism and the mounting element on the underwater cable after the sacrificial element gives way.

19. A device connected to an underwater cable having mounting elements disposed therealong, comprising:

a housing;

a retainer;

a latch body attached to the housing by the retainer in normal operating conditions;

a locking member extending between the latch body and a mounting element and holding the latch body securely to the mounting element in a locked position to connect the device to the underwater cable; and a sacrificial element that gives way to release the attachment of the latch body to the housing by the retainer in response to a force greater than normal operating forces acting on the latch body before the force increases to a level sufficient to damage the housing, wherein the sacrificial element forms a portion of the latch body.

20. A device as in claim 19 wherein the latch body forms a bore and the retainer extends through the bore into the housing and wherein the sacrificial element comprises a portion of the latch body around the bore.

* * * * *